US011520689B2

(12) United States Patent
Bier et al.

(10) Patent No.: US 11,520,689 B2
(45) Date of Patent: Dec. 6, 2022

(54) SYSTEM AND METHOD FOR AUTOMATIC PROGRAM REPAIR USING FAST-RESULT TEST CASES

(71) Applicant: Palo Alto Research Center Incorporated, Palo Alto, CA (US)

(72) Inventors: Eric A. Bier, Palo Alto, CA (US); Alexandre Campos Perez, San Mateo, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 112 days.

(21) Appl. No.: 17/135,668

(22) Filed: Dec. 28, 2020

(65) Prior Publication Data

US 2022/0206930 A1    Jun. 30, 2022

(51) Int. Cl.
*G06F 11/00* (2006.01)
*G06F 11/36* (2006.01)

(52) U.S. Cl.
CPC ...... *G06F 11/3688* (2013.01); *G06F 11/3664* (2013.01)

(58) Field of Classification Search
CPC ............. G06F 11/3664; G06F 11/3688; G06F 11/3692
See application file for complete search history.

(56) References Cited

U.S. PATENT DOCUMENTS

| 7,484,205 B2* | 1/2009 | Venkatapathy | G06F 11/3624 717/158 |
| 8,627,296 B1* | 1/2014 | Picard | G06F 11/3684 717/124 |
| 8,954,929 B2* | 2/2015 | Braude | G06F 11/3688 717/124 |
| 10,678,673 B2* | 6/2020 | Saha | G06F 11/362 |
| 2007/0033442 A1* | 2/2007 | Tillmann | G06F 11/3684 714/45 |
| 2008/0256517 A1* | 10/2008 | Atkin | G06F 11/3688 717/124 |
| 2013/0019216 A1* | 1/2013 | Vasudevan | G06F 30/3323 716/106 |
| 2019/0212992 A1* | 7/2019 | Jonnadula | G06F 8/447 |
| 2020/0319992 A1* | 10/2020 | Masis | G06N 5/048 |

* cited by examiner

*Primary Examiner* — Elmira Mehrmanesh
(74) *Attorney, Agent, or Firm* — Shun Yao; Yao Legal Services, Inc.

(57) ABSTRACT

One embodiment provides a system for automatic program repair (APR). The system identifies a first set of components under repair in a software system and determines, while executing an original test, second and third sets of components that are executed before and after, respectively, the first set of components. The system generates a first block of mock code that runs faster and simulates runtime behaviors of the second set of components, identifies a code region within the third set of components that affects a test result of the software system, and generates a second block of mock code that runs faster and affects the test result similarly. The system generates a fast-result test by replacing the second set of components with the first block of mock code and replacing the third set of components with the second block of mock code and performs APR by executing the fast-result test.

18 Claims, 6 Drawing Sheets

SYSTEM AND METHOD FOR AUTOMATIC PROGRAM REPAIR USING FAST-RESULT TEST CASES

BACKGROUND

Field

This disclosure is generally related to automatic repair of computer programs. More specifically, it is related to a system and method that can accelerate the repair process using fast-result test cases.

Related Art

In computer programming and software development, debugging is the process of finding and resolving bugs (defects or problems that prevent correct operation) within computer programs, software, or systems. Debugging a program can be very time-consuming and arduous, and automated debugging tools have been developed.

Various fault-localization tools can help programmers to find those lines of code that are most likely to cause failures of a particular software test or set of tests. A programmer or developer can then review those failure-causing lines of code and make changes to repair the program. However, manual repair can be time-consuming and error-prone, given that complex software projects often contain computer code developed by different people over different time periods.

Automated program repair (APR) reduces the burden of fixing software errors or bugs by suggesting likely correct patches for those errors. Typical APR approaches rely on running many test cases. The speed of running the test cases can be a dominant factor in the success or failure of the APR.

SUMMARY

One embodiment provides a system and method for automatically repairing faults in a software system. During operation, the system identifies a first set of components under repair in the software system and determines, while executing an original test of the software system, a second set of components which are executed before the first set of components and a third set of components which are executed after the first set of components. The system generates a first block of mock code simulating runtime behaviors of the second set of components; the first block of mock code runs faster than the second set of components. The system identifies a code region within the third set of components that affects a test result of the software system and generates a second block of mock code that affects the test result in a way similar to the identified code region; the second block of mock code runs faster than the third set of components. The system then generates a fast-result test corresponding to the original test by replacing the second set of components with the first block of mock code and replacing the third set of components with the second block of mock code and performs automatic program repair (APR) on the software system by executing the fast-result test.

In a variation on this embodiment, performing the APR can include: mutating the first set of components under repair for each execution of the fast-result test; in response to a mutation resulting in a successful execution of the fast-result test, re-running the original test; and in response to the mutation resulting in a successful execution of the original test, recommending the mutation as a correct repair.

In a further variation, mutating the first set of components can include one or more of: adding a line of code, deleting a line of code, and modifying a line of code.

In a variation on this embodiment, identifying the first set of components under repair can include performing a spectrum-based fault-localization operation.

In a variation on this embodiment, the system determines, while executing the original test, a fourth set of components. Execution of the fourth set of components interleaves execution of the first set of components. The system further identifies code regions within the fourth set of components that can be simulated using a third block of mock code and replaces the identified code regions within the fourth set of components with the third block of mock code. The third block of mock code runs faster than the fourth set of components.

In a variation on this embodiment, generating a respective block of mock code can include detecting invariant variables (i.e., variables having constant or predictable values) and generating the respective block of mock code so that it sets those invariant variables to their corresponding constant or predictable values, while avoiding any other computations performed by the original code.

In a variation on this embodiment, identifying the code region within the third set of components that affects the test result can further include identifying one or more variables whose values provide a prediction of the test result.

In a further variation, the second block of mock code can include code that tests the values of the identified one or more variables.

In a further variation, generating the second block of mock code can further include performing a backward slicing analysis to identify code regions within the third set of components that are not related to the identified one or more variables and removing the identified code regions.

In a further variation, the system can partition the fast-result test into multiple smaller tests, in response to determining that multiple identified variables are computed independently. Each smaller test is configured to test a subset of identified variables, and partitioning the fast-result test can include performing a backward slicing analysis for each identified variable.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein provide a solution to the technical problem of accelerating the process for running test cases while performing automatic program repair (APR). During operation, the system can partition a test case into multiple portions based on a likelihood that particular code components are the cause of a test failure and the order of execution of the code components. More specifically, code components within the test case can be categorized into four different types: initialization components, mutable components, middle components, and conclusion components. The mutable components are code components that are most likely to be causing the error. The initialization components are components executed before all mutable components. The middle components are components executed between mutable components, and the conclusion components are components executed after all mutable components. To accelerate execution of the test case, components other than the mutable components can be approximated using code (sometimes referred to as mock code) that runs much faster but usually produces the same test result (success or failure).

Categorizing Components in Test Cases

Automatic program repair (APR) approaches try to synthesize a code patch that fixes a certain observable fault in a body of software. APR takes as input a misbehaving program as well as a correctness oracle (e.g., the program test suite) that indicates when the fault is successfully repaired. APR approaches typically run fault-localization tools as a pre-processing step, pinpoint the code locations that are the likely root causes of the failing tests, and then prune the APR search space. There are three types of APR approach: heuristic repair, constraint-based repair, and learning-based repair.

The heuristic repair approach employs a generate-and-test methodology by iterating over a search space of syntactic code transformations. The constraint-based repair works by generating repair constraints that the repaired code should satisfy and using constraint solving or symbolic execution to synthesize a patch. On the other hand, the learning-based repair approach mines a large corpus of program patches and infers code transformation patterns from previous successful patches. Regardless of which approach is used, the APR process typically requires many runs of the test cases.

Figure 1:
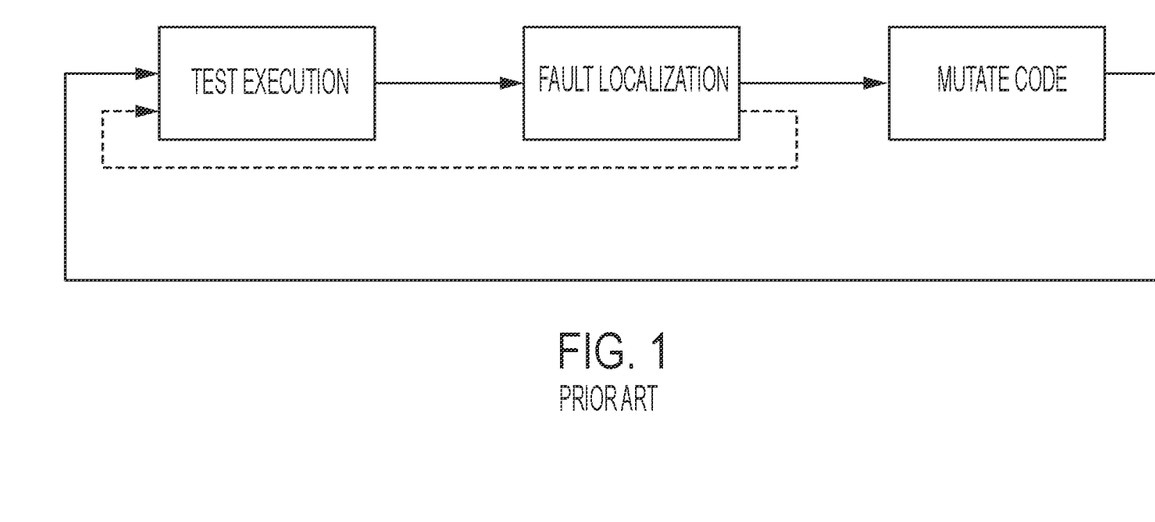
FIG. 1 illustrates a high-level view of the process of automatic program repair (APR), according to prior art.

FIG. 1 illustrates a high-level view of the process of automatic program repair (APR), according to prior art $_{[PVFD1]}$. The process typically starts with the execution of a test suite, which can include a collection of test cases that are intended to be used to test a software program to show that it has some specified set of behaviors. Note that a test case is a specification of the inputs, execution conditions, testing procedure, and expected results that define a single test to be executed to achieve a particular software testing objective. One or more failed test cases can indicate errors (commonly referred to as bugs) in the software.

The process continues with fault localization, where automated tools can be used to find those lines of code that are most likely to cause failures of a particular software test or set of tests. Once faults are located, the system can mutate the identified lines of code (e.g., by applying a series of additions, deletions, substitutions, etc.). After each mutation, the test suite is run again to see if the mutation has removed the error (e.g., passing the previously failed test) or moved the behavior of the software closer to the desired state. The entire process is repeated (as shown by the arrow) until the mutated program can pass all tests (indicating the error is fixed) or until a pre-determined amount of time or resources has been consumed and the APR process abandons the repair attempt.

From FIG. 1, one can see that the success or failure of the APR process depends critically on the execution speed of the test cases. Not only each mutated version of the program needs to be verified by running the test cases, the fault localization also requires multiple runs of the test cases (as shown by the dashed arrow). Due to limited time and/or computational resources, speedy test execution can lead to a large number of mutations being tried, making it more likely to find a successful mutation. Therefore, it is desirable to find ways to accelerate test execution during the APR process. A straightforward way to increase the test speed is to design more focused tests, i.e., tests that have coverage over the faulty components while bypassing other non-faulty components. However, such an approach may not always be available, because it may be impossible to only run the faulty components in a complex software system. Moreover, the test case of a complex software system can still take a long time to run, even if certain non-faulty portions have been bypassed.

In some embodiments, to further accelerate the execution of a particular test case during APR, the APR system can replace certain portions or components within the test case using code that can run much faster, without changing the behavior of the program. The code used to replace the original code in the program can be referred to as mock code, and the process of replacing the original code with the mock code can be referred to as mocking. Mocking, when done correctly, can improve test efficiency without jeopardizing the accuracy of the test result. To do so, the APR system needs to first identify portions of the programs that can be mocked and it needs to generate appropriate mock code for the identified portions.

In some embodiments, code regions (also referred to as code components or simply components) within a particular test case for a program can be categorized into different categories, and mocking can be selectively applied to different components based on their respective category as well as their runtime behavior. Note that a component can include statements, functions, methods, classes, code blocks, or individual lines of code, depending on the chosen level of granularity. In one embodiment, the components can be grouped into four categories: the initialization components, the mutable components, the middle components, and the conclusion components.

More particularly, components that have been identified by the fault-localization process as the likely causes of test failure can be categorized as the mutable components. In other words, these components are to be mutated (e.g., by adding, deleting, substituting certain line or lines of code) by the APR system in order to try to repair the program. If a particular mutated version of the mutable components passes the tests with mocked code blocks in place, this mutated version is then tested further by restoring the original un-mocked code blocks and running the code again. While this additional test is done using the original, slower version of the software, it is acceptable because such slower tests are done much less frequently than the fast tests; APR generally needs to try many mutations before finding one that passes the tests.

Software components that run before all mutable components during the execution of the test case will be called initialization components for our purposes. The initialization components are the part of the software that creates the variable settings, data structures, data files, heap contents, and stack contents that provide the context for the components that require repair (i.e., the mutable components). They are called initialization components because they initialize or set up the runtime environment for the subsequently executed mutable components. The time to run a test case can be significantly shortened if the initialization components can run faster. In some embodiments, fast initialization can be achieved by replacing one or more initialization components using mock code that mocks the behavior of the initialization components but runs much faster. It is desirable that running the mock code instead of the original initialization code does not change the test result (e.g., passing or failing the test). If the original code passes or fails a particular test, then the mock code should be generated so that it is likely to similarly pass or fail that particular test.

For example, after observing a number of initialization components of a particular test over many runs, one may discover that these components always deliver the same variable values to the other components in the system under test (SUT). In such a situation, the APR system can replace such components with a block of mock code that directly sets the variable values. In other words, instead of running the initialization components (which can include hundreds or thousands of lines of code), the test now runs just the block of mock code (which can include just a few assignment statements), thus significantly accelerating the initialization.

In a hypothetical example, the initialization code of a test case ti includes an object of class "Fruits," which always returns the array {"Apple," "Banana," "Cherry"} when the getFruits method is invoked, returns 'Apple' when preferredFruit is invoked, or returns the date 20210101 when expirationDate is called. For the purpose of test ti, the following block of mock code (or a mock object) can be used to replace the original initialization code calling class "Fruits."

Fruits = *createNiceMock*(*Fruits.class*);

expect(*f.getFruits*()).*andReturn*({"Apple," "Banana," "Cherry"});

expect(*f.preferredFruit*()).*andReturn*("Apple");

expect(*f.expirationDate*()).*andReturn*(Date(20210101));

If the original body of code ran through over 1,000 instructions, used a database, and accessed a file server to compute these values, then this mock version that includes four lines of code will run significantly faster than the original initialization code. Hence, a test incorporating the mock code can be referred to as a fast-result test, because passing or failing of the test can be determined much more quickly.

Software components that run after all mutable components during the execution of the test case can be categorized as conclusion components. The conclusion components include the final comparison that determines if the test succeeds or fails, hence the name "conclusion." In the above example, whether test ti passes or fails might be determined based on whether the final value of a certain variable is "Cherry." However, the conclusion components may also include blocks of code that do things that are irrelevant to the test result, such as performing a long database query that has no bearing on the value of the variable of interest. Running those code blocks prolongs the test execution time. Hence, it may be desirable to bypass those code blocks or replace those code blocks with fast-running mock code.

To successfully mock the conclusion components, the APR system first needs to identify components or lines of code that directly affect the test result. The APR system can then replace those code lines with a block of mock code that similarly affects the test result but runs faster. For example, after observing many runs of a test case, one may discover that the success or failure of the test can be predicted reliably by the value of a variable, "fruit1," at the time the conclusion components begin to run, while being completely uncorrelated with other variables found at that time. In such a case, the APR system can stop the test early and examine variable "fruit1" to produce a test result.

Furthermore, the conclusion components can be further pruned via a backward slicing analysis of the test assertions, removing all statements that do not directly affect data flow on the variables being asserted in the test. In other words, statements or code lines that are not related to the result-predicting variable or variables can be simply removed. In the aforementioned example, the APR system can replace the conclusion components with a line of code such as: assertEquals(fruit1,"Cherry"). This can significantly reduce the time needed to run the conclusion components. In this example, the long database query will not be run at all.

On the other hand, software components that interleave with the mutable components are called the middle components. Handling the middle components requires careful consideration. Although the middle components are not in the code region that is being mutated (i.e., the mutable components), they are run while those mutable components are active. Hence, inputs of the middle components are directly affected by the mutated code that runs before, and outputs of the middle components will directly affect the mutated code that runs after.

A straightforward technique is to keep the middle components unchanged (i.e., no mocking in the middle components). This can avoid disturbance to the test result. However, doing so can also mean a missed opportunity to further speed up the test execution. In some embodiments, the APR system can examine the middle components (e.g., by observing their runtime behavior) to identify components or lines of code that can be mocked. In some embodiments, the APR system can first run the test without mocking the middle components to identify statements that do not affect control and data flow with respect to the variables being tested. The APR system can then remove the identified statements or replace them with simple mock code. In some embodiments, after running the test multiple times without mocking the middle components, the APR system can identify certain predictable dynamic behavior of the middle components. Accordingly, the APR system can create mock code that replaces the predictable dynamic behavior with static patterns. For example, after observing the behavior of the middle components over many runs of test ti, the APR system may determine that the middle components always call the mutable components three times and always pass arguments "Apple," "Banana," and "Cherry," in that order. Accordingly, the APR system can generate a few lines of mock code that loop through those values, calling the mutable components once for each value. Such mock code can then be used to replace the original code in the middle components, thus significantly speeding up the execution of those middle components and, hence, of test ti.

Figure 2:
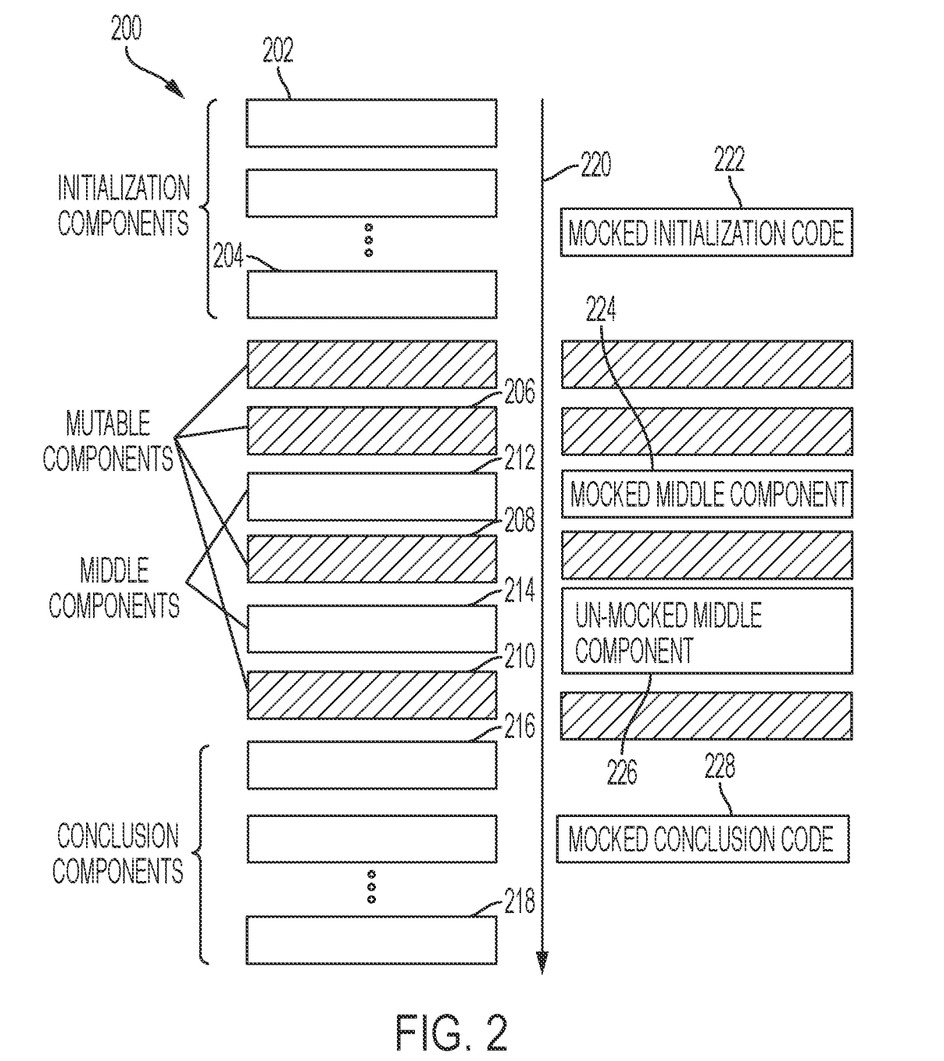
FIG. 2 illustrates various types of components of a software system under test (SUT) in a test case, according to one embodiment.

FIG. 2 illustrates various types of components of a software system under test (SUT) in a test case, according to one embodiment. Under a particular test condition (e.g., when running test case ti), components in SUT 200 can be categorized into four types: the initialization components (e.g., components 202 and 204), the mutable components (e.g., components 206, 208, and 210), the middle components (e.g., components 212 and 214), and the conclusion components (e.g., components 216 and 218). Arrow 220 indicates the running order of the various components, with the arrowhead pointing toward components that run later. Note that the linear sequence shown in FIG. 2 is the result of the unwrapping of a more convoluted running sequence that includes loops or has a particular component run multiple times at different instants. In other words, a component shown in FIG. 2 may be a duplicate copy of another component, with the components arranged to reflect the corresponding running order of these components.

As discussed previously, mutable components are components of interest for a particular test (e.g., components requiring repair). In other words, mutable components are to be mutated during APR in order to find suitable software patches to correct any error in the software. In FIG. 2, mutable components are shaded. FIG. 2 also shows that the initialization components run before all mutable components, the conclusion components run after all mutable components, and the middle components interleave with the mutable components (e.g., middle component 212 runs between mutable components 206 and 208, and middle component 214 runs between mutable components 208 and 210).

The right side of FIG. 2 shows the mocked version of SUT 200. In this example, the initialization components can be replaced with mocked initialization code block 222, which can include a few lines of assignment statements. The mutable components remain un-mocked but can be mutated according to certain APR techniques. Depending on their runtime behavior, some of the middle components can also be mocked, while others remain unchanged. In this example, middle component 212 can be replaced using mocked middle component 224, and middle component 214 remains unchanged as un-mocked middle component 226. The conclusion components, on the other hand, are now replaced with a mocked conclusion code block 228.

The mock code has replaced the more complex and time-consuming computations with simple assignment statements and assertion statements. Therefore, running the mocked version of the test case can be much faster than running the test case with the original code to provide the result (i.e., passing or failing the test). When time and computational resources are limited, running such fast-result tests allows an increased number of mutations to be carried out, thus increasing the likelihood of finding a successful mutation, thus a correct repair, to the SUT.

In the example shown in FIG. 2, there are multiple mutable components, meaning that there are multiple components needing repair. In some embodiments, instead of attempting to repair the multiple components at the same time, the APR system may choose to focus on a single component at a time. For example, the system can choose a single component as the mutable component and categorize other components in the SUT according to their runtime order with respect to the chosen component. One advantage of such an approach is that, unless the chosen component runs multiple times during the test, it is no longer necessary to include the middle components. This makes the mocking process much simpler. Once the error is fixed in the chosen component, the APR system can move on to fix errors in a different component. Parallel processing can also be possible, depending on whether the multiple mutable components depend on each other during test runs.

Because the mock code is an approximation of the original code, in certain situations, the mock code can introduce errors. For example, if f.expirationDate( ) is supposed to return today's date plus an offset, a previously observed fixed value (also referred to as a canned value, such as 20210101) will not produce the same result. Errors introduced by the mock code may cause otherwise successful tests to fail. In certain situations, a test may only succeed if live data is used and will always fail when mocked data is used. For example, a test may compare the canned version of f.expirationDate( ) from one part of the code with the live version of today's date from another part of the code to see if the expiration date comes after today's date. If the canned version of the expiration date is stale enough, the test will always fail. Several strategies can be implemented to avoid such a situation. One strategy is to update the canned value of certain variables (e.g., the expiration date) frequently to prevent them from turning stale. Another strategy is to run the test over a prolonged time and record canned values of certain variables. If the canned value of a particular variable varies over time, the APR system will stop using the mocked version of the variable. Alternatively, the APR system can also stop using mock code for certain variables based on the data type of the variables. For example, the APR system does not use the mock code for time-varying variables (e.g., date, temperature, a person's age, etc.). Furthermore, if the value of a variable is obtained from querying an external database that is updated constantly, the APR system may also choose not to use the mock code for that particular variable.

In addition to causing test failure, sometimes the mock code may also create a false negative, i.e., an otherwise failed test is passed if mocked-up data is used. To confirm that a mutation passing the fast-result test (i.e., the test incorporating mock code) can indeed provide a correct software patch, in some embodiments, subsequent to identifying a successful mutation using the fast-result test, the APR system runs the mutation again using the original test. A software patch is labeled as correct and suggested to users only after it can pass the original non-mocked test. Mutations that pass the fast-result test but fail the original non-mocked test will be discarded. Considering that successful mutations are much less common than failing mutations, the APR system does not need to run the original test often.

Generating and Executing Fast-Result Test Cases

Figure 3:
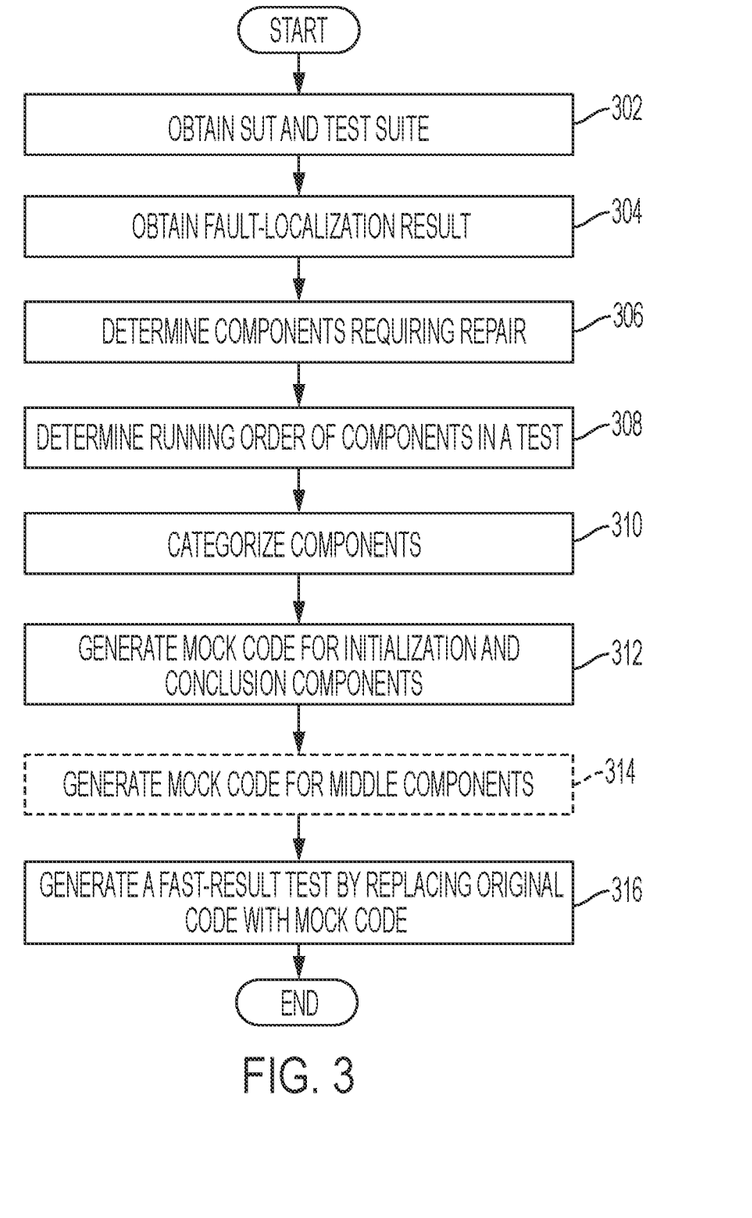
FIG. 3 presents a flowchart illustrating an exemplary process for generating a fast-result test, according to one embodiment.

FIG. 3 presents a flowchart illustrating an exemplary process for generating a fast-result test, according to one embodiment. During operation, the APR system receives an SUT and obtains a number of tests or a test suite that can be used for diagnosis and/or repair purposes for an SUT (operation 302). The tests can be written manually by software developers or can be generated automatically using techniques such as automatic invariant detection. Detailed descriptions of automated test generation can be found in co-pending U.S. application Ser. No. 17/035,470, entitled "SYSTEM AND METHOD FOR GENERATING COUN- TEREXAMPLE TESTS OF INCIDENTAL INVARIANTS," filed Sep. 28, 2020, which is herein incorporated by reference in its entirety.

The APR system can further obtain, from a fault-localization system, the fault-localization result of the SUT (operation 304). In some embodiments, the fault-localization system can use a spectrum-based technique to identify and locate faults and output a fault report. In the event that an ambiguity group exists, a state-based technique can be used to break the ambiguity group. Detailed descriptions regarding breaking an ambiguity group during fault localization can be found in co-pending U.S. patent application Ser. No. 17/035,485, entitled "SYSTEM AND METHOD FOR IDENTIFYING A FAULTY COMPONENT IN A SPECTRUM AMBIGUITY GROUP," filed Sep. 28, 2020, the disclosure of which is herein incorporated by reference in its entirety. In one embodiment, the fault-localization system can be a sub-module of the APR system. In addition to spectrum-based fault localization, other fault-localization techniques can also be used to identify and locate faults. The scope of this disclosure is not limited by the exact technique used for fault localization.

The fault report can identify one or more components within the SUT that are likely the causes of certain test failures. Depending on the granularity of the fault-localization system, a component can include statements, functions, methods, classes, code blocks, or individual lines of code. For example, a component can include a method or a function. Based on the fault report, the APR system can determine one or more components that require repair (operation 306). These components are the mutable components that will be mutated during the APR process.

Because the running order of the various components in the SUT may be different for different test cases, the APR system can run a particular test of interest to determine the running order (operation 308). Note that the particular test of interest can be a failed test identified by the fault-localization system. In certain scenarios, the fault-localization system can provide additional information (e.g., the running order of all components), and operation 308 can be skipped.

The APR system can categorize the various components in the SUT into different types based on their running order for that particular test (operation 310). More specifically, components that run before all mutable components are identified as initialization components, which can provide context (e.g., variable settings, data structures, data files, heap contents, stack contents, etc.) for the mutable components. Components that run after all mutable components are identified as conclusion components, which can provide information used to determine whether the test succeeds or fails. On the other hand, components interleaving with mutable components are identified as middle components.

The APR system can then generate mock code for the initialization and conclusion components (operation 312). In some embodiments, generating mock code for the initialization components can involve observing the runtime behavior of these initialization components (e.g., observing which lines of code are traversed during tests and values assigned to variables). The observed runtime behavior can be used as inputs to construct the mocked initialization code. For example, observed values of variables can be used to generate assignment statements to directly assign such values to the variables. Those lines of code that were not traversed during the test will not be included in the mocked code. In a further embodiment, the APR system can also detect invariants, which are variables having the same or similar values through the entire code region (e.g., the initialization code region, the middle code region, or the conclusion code region) for all tests run. When detecting the invariants, the APR system can distinguish incidental invariants from true invariants. Details regarding detecting incidental invariants can be found in the aforementioned co-pending U.S. application Ser. No. 17/035,470. Given the detected invariants, the APR system can generate mock code that sets the values of the corresponding variables to their expected values. In addition to setting variable values, the mock code can also be used to mock the behavior of an object or method. When the SUT interacts with an external service (e.g., a weather service providing weather data), the APR system can generate mock code that mocks the response from the external service.

Generating mock code for the conclusion code region can also involve running the test multiple times to identify code regions or lines of code that can directly affect the test result. For example, certain values of variables at the beginning of the conclusion code region can accurately predict the success or failure of the test. Accordingly, the APR system can generate mock code that can affect the test result in a similar way, such as mock code designed to test the values of those identified result-predicting variables.

In some embodiments, the APR system can determine that the success or failure of a given test can depend on testing the values of multiple variables that are computed independently by different code regions. In such cases, the APR system can break the given test into multiple smaller tests, with each test designed to test a particular variable value. The APR system can then generate mock code for each smaller test to ensure that the execution speed of each smaller test can be optimized. Note that, while breaking up the given test into multiple smaller tests, the APR system can apply a backward slicing analysis to identify code components that are relevant to the property being tested and only include such components into the corresponding smaller test. Breaking up the larger test into multiple smaller tests allows parallel execution of the multiple tests, thus further increasing the test speed. Note that any failed smaller test can be an indication of a failed mutation. As an alternative to the parallel testing, the APR system can establish a test-execution priority to ensure that tests that are more likely to fail will be executed first. Such a priority can be determined based on the diagnostic runs of the APR system.

An added benefit of breaking a large test case into multiple smaller ones is that it helps the fault-localization operation, which typically uses per-test coverage information to correlate test failures with component coverage patterns. It has been shown that a backward analysis on each assertion of a test case (which can typically have a handful of assertions) produces widely different code slices having different code coverage patterns. When some but not all of the assertions within the test fail, the more granular set of broken-up tests will help with fault isolation, because successful tests can indicate that those associated code regions are less likely to be faulty.

The APR system can optionally generate mock code for the middle components (operation 314). Generating mock code for the middle code region can involve running the test multiple times to observe the runtime behavior of the various middle components. If one or more middle components exhibit predictable behaviors, the APR system can generate mock code to mock such behavior.

Subsequently, the APR system can create a fast-result test (which is the mocked version of the original test) by replacing the original code with mock code (operation 316). The mock code runs much faster than the original code but does not affect the test result. In other words, the fast-result test and the original test will produce the same result (passing or failing) for any given test. The process shown in FIG. 3 can be performed for each test (or more particularly each failed test) in the test suite. The collection of fast-result tests can then be used during the APR process to facilitate efficient program repair.

Figure 4:
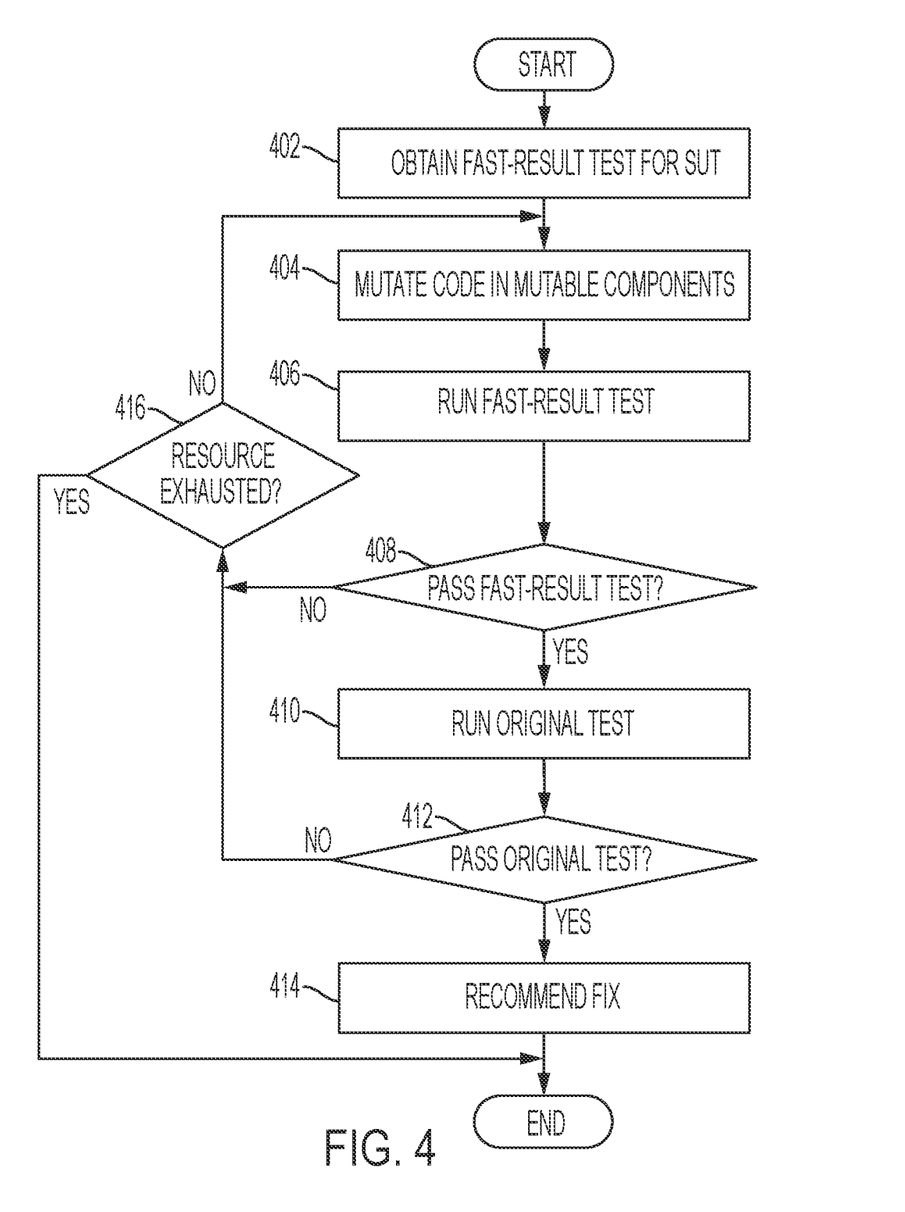
FIG. 4 presents a flowchart illustrating an exemplary APR process using fast-result tests, according to one embodiment.

FIG. 4 presents a flowchart illustrating an exemplary APR process using fast-result tests, according to one embodiment. During operation, the system obtains a fast-result test case for an SUT needing repair (operation 402). The fast-result test case can have mocked initialization code, mutable components that are not mocked, optionally mocked middle components, and mocked conclusion code. The fast-result test can be generated from a test case that is failed by the SUT.

The APR system can mutate the mutable components (i.e., applying software patches) based on a predetermined automatic repair strategy (operation 404). Various techniques can be used to mutate the code in the mutable components, including but not limited to: applying a change operator at a single point, using pre-defined templates, using example-based templates, using semantic-driven techniques, searching a database of existing software patches, etc. The scope of this disclosure is not limited by the technique used to mutate the code.

Subsequent to the mutation, the APR system runs the fast-result test (operation 406) and determines if the mutation allows the SUT to pass the fast-result test (operation 408). If so, the APR system runs the original (i.e., unmocked) test (operation 410) and determines if the current mutation passes the original test (operation 412). If so, the APR system recommends the current mutation as a fix to the SUT (operation 414). Alternatively, the APR system can apply the current mutation to the SUT and the repaired SUT can be subjected to different tests to identify, locate, and repair additional errors in the SUT.

If the mutation fails the fast-result test, the APR system determines if a predetermined quantity of resources have been exhausted (operation 416). The resources can include both temporal and computational resources. If the resources have been exhausted, the APR system ends its operation. Otherwise, the APR system repeats the process of modifying the mutable components (operation 404). Because the fast-result test consumes few resources (it runs faster and uses fewer computational resources), an increased number of iterations can be performed before the predetermined quantity of resources are exhausted, compared with running the original test.

In one embodiment, a large number of failed mutations may indicate problems with the mock code used in the test. For example, the mock code may introduce errors. In such situations, the APR system can choose to revise the mock code or turn off the mocking. Note that when the mocking is turned off, the system is essentially running the original test case and can be slowed down significantly.

Exemplary APR System

Figure 5:
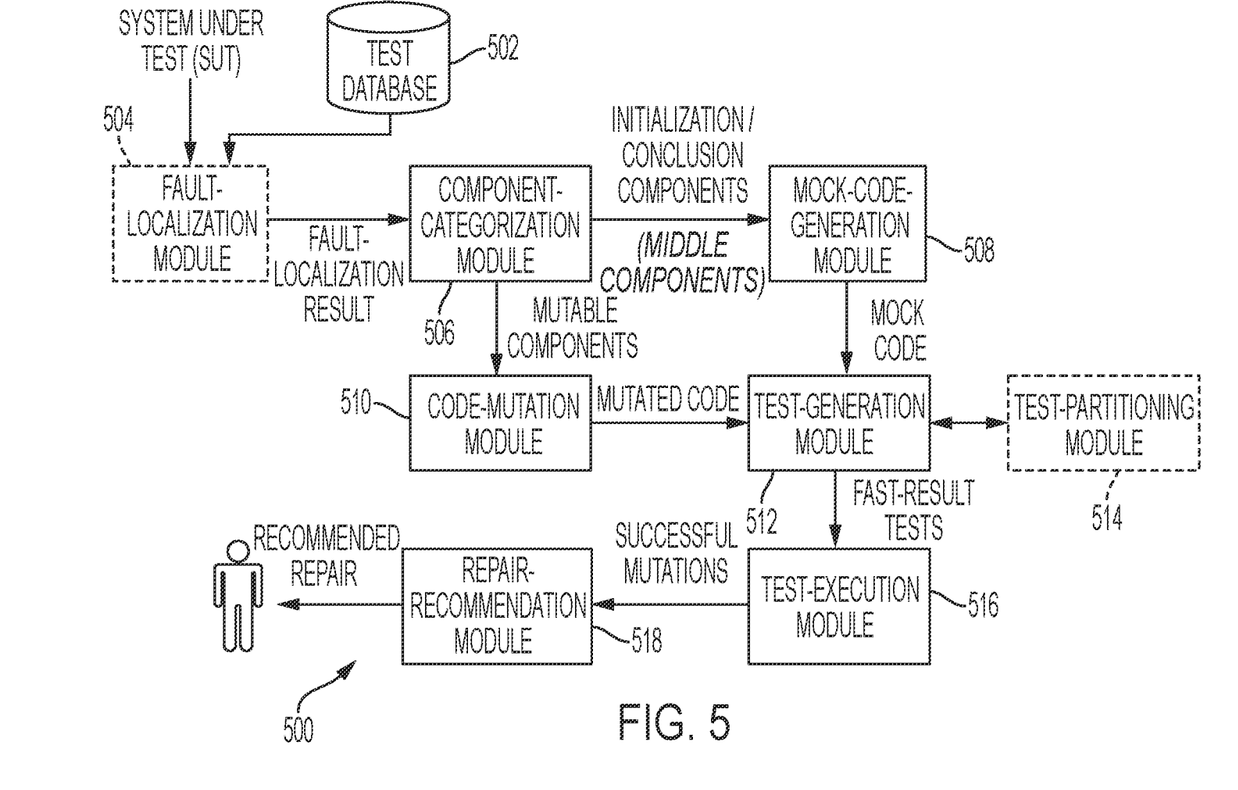
FIG. 5 illustrates an exemplary APR system, according to one embodiment.

FIG. 5 illustrates an exemplary APR system, according to one embodiment. APR system 500 can include a test database 502, an optional fault-localization module 504, a component-categorization module 506, a mock-code-generation module 508, a code-mutation module 510, a test-generation module 512, an optional test-partitioning module 514, a test-execution module 516, and a repair-recommendation module 518.

Test database 502 stores one or more test suites for a software SUT. Fault-localization module 504 can perform various tests to identify and locate faults in the SUT. In some embodiments, fault localization can be performed by a tool or system external to APR system 500.

Results of the fault localization (e.g., a fault report) can be used as inputs to component-categorization module 506, which categorizes the various components (e.g., functions, methods, objects, code blocks, statements, etc.) in the SUT based on their relationship to one or more identified errors in the SUT and the running order of the components in a particular test. Note that different tests may correspond to different ways of categorizing the components. A mutable component in one test can become an initialization component in another test. Similarly, an initialization component in one test may become a middle component in a different test. Mock-code-generation module 508 generates mock code for certain types of components (e.g., the initialization components, the conclusion components, and optionally the middle components). Code-mutation module 510 modifies code in the mutable components to find repairs to the software errors.

Test-generation module 512 generates fast-result tests by replacing original code in the SUT with the corresponding mock code generated by mock-code-generation module 508. The fast-result tests run faster than their corresponding original tests but can provide the same test results (e.g., passing or failing the test) for the same mutation. Test-partitioning module 514 can optionally partition a larger test into multiple smaller tests that can run in parallel, sequentially, or in place of larger tests to further increase test efficiency.

Test-execution module 516 runs the tests, including the fast-result tests for each mutation and the original tests to validate a successful mutation. A successful mutation is recommended by repair-recommendation module 518 to the user as a possible fix only after it can also pass the original test.

Figure 6:
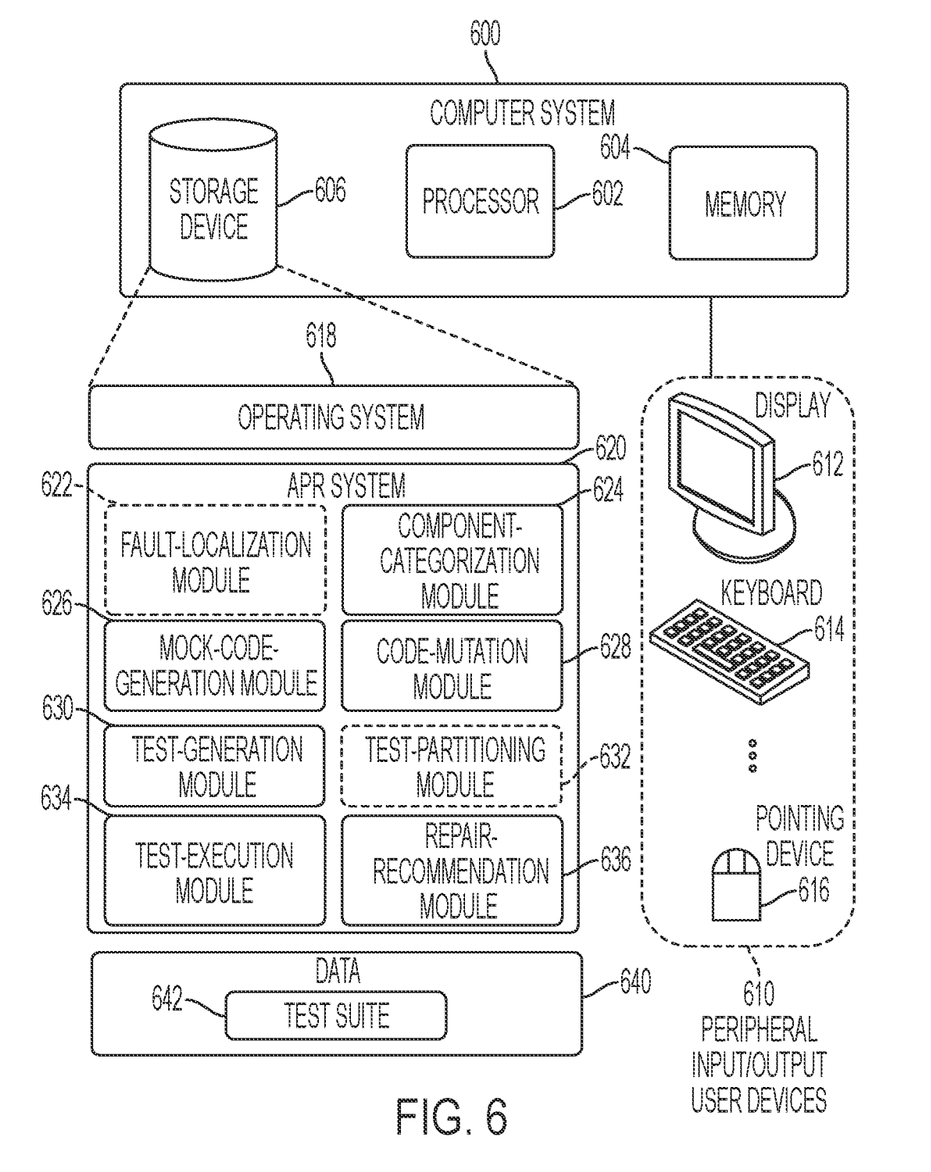
FIG. 6 illustrates an exemplary computer system, according to one embodiment.

FIG. 6 illustrates an exemplary computer system, according to one embodiment. Computer system 600 includes a processor 602, a memory 604, and a storage device 606. Furthermore, computer system 600 can be coupled to peripheral input/output (I/O) user devices 610, e.g., a display device 612, a keyboard 614, and a pointing device 616. Storage device 606 can store an operating system 618, an APR system 620, and data 640.

APR system 620 can include instructions, which when executed by computer system 600, can cause computer system 600 or processor 602 to perform methods and/or processes described in this disclosure. Specifically, APR system 620 can include optional instructions for identifying and locating faults in a software SUT (fault-localization module 622), instructions for categorizing components in the SUT (component-categorization module 624), instructions for generating mock code for certain types of component (mock-code-generation module 626), instructions for mutating code (code-mutation module 628), instructions for generating fast-result tests (test-generation module 630), optional instructions for partitioning a larger test into multiple smaller tests (test-partitioning module 632), instructions for executing tests (test-execution module 634), and instructions for recommending program repair to users (repair-recommendation module 636). Data 640 can include a test suite 642.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for automatically repairing faults in a software system, the method comprising:
   identifying, by a computer, a first set of components under repair in the software system;
   determining, while executing an original test of the software system, a second set of components which are executed before the first set of components and a third set of components which are executed after the first set of components;
   generating a first block of mock code simulating runtime behaviors of the second set of components, wherein the first block of mock code runs faster than the second set of components;
   identifying a code region within the third set of components that affects a test result of the software system, which comprises identifying one or more variables whose values provide a prediction of the test result;
   generating a second block of mock code that affects the test result in a way similar to the identified code region, wherein the second block of mock code runs faster than the third set of components;
   generating a fast-result test corresponding to the original test by replacing the second set of components with the first block of mock code and replacing the third set of components with the second block of mock code; and
   performing automatic program repair (APR) on the software system by executing the fast-result test.

2. The computer-implemented method of claim 1, wherein performing the APR comprises:
   mutating the first set of components under repair for each execution of the fast-result test;
   in response to a mutation resulting in a successful execution of the fast-result test, re-running the original test; and
   in response to the mutation resulting in a successful execution of the original test, recommending the mutation as a correct repair.

3. The computer-implemented method of claim 2, wherein mutating the first set of components comprises one or more of:
   adding a line of code;
   deleting a line of code; and
   modifying a line of code.

4. The computer-implemented method of claim 1, wherein identifying the first set of components under repair comprises performing a spectrum-based fault-localization operation.

5. The computer-implemented method of claim 1, further comprising:
   determining, while executing the original test, a fourth set of components, wherein execution of the fourth set of components interleaves with execution of the first set of components;
   identifying code regions within the fourth set of components that can be simulated using a third block of mock code; and
   replacing the identified code regions within the fourth set of components with the third block of mock code.

6. The computer-implemented method of claim 1, wherein generating a respective block of mock code comprises:
   detecting invariants; and
   generating the respective block of mock code by setting values of the invariants.

7. The computer-implemented method of claim 1, wherein the second block of mock code comprises code that tests the values of the identified one or more variables.

8. The computer-implemented method of claim 1, wherein generating the second block of mock code further comprises:
   performing a backward slicing analysis to identify code regions within the third set of components that are not related to the identified one or more variables; and
   removing the identified code regions.

9. The computer-implemented method of claim 1, further comprising:
   in response to determining that multiple identified variables are computed independently, partitioning the fast-result test into multiple smaller tests, wherein each smaller test is configured to test a subset of identified variables, and wherein partitioning the fast-result test comprises performing a backward slicing analysis for each identified variable.

10. A non-transitory computer-readable storage medium storing instructions that when executed by a computer cause the computer to perform a method for automatically repairing faults in a software system, the method comprising:
   identifying a first set of components under repair in the software system;
   determining, while executing an original test of the software system, a second set of components which are executed before the first set of components and a third set of components which are executed after the first set of components;
   generating a first block of mock code simulating runtime behaviors of the second set of components, wherein the first block of mock code runs faster than the second set of components;

identifying a code region within the third set of components that affects a test result of the software system, which comprises identifying one or more variables whose values provide a prediction of the test result;
generating a second block of mock code that affects the test result in a way similar to the identified code region, wherein the second block of mock code runs faster than the third set of components;
generating a fast-result test corresponding to the original test by replacing the second set of components with the first block of mock code and replacing the third set of components with the second block of mock code; and
performing automatic program repair (APR) on the software system by executing the fast-result test.

11. The non-transitory computer-readable storage medium of claim 10, wherein performing the APR comprises:
mutating the first set of components under repair for each execution of the fast-result test;
in response to a mutation resulting in a successful execution of the fast-result test, re-running the original test; and
in response to the mutation resulting in a successful execution of the original test, recommending the mutation as a correct repair.

12. The non-transitory computer-readable storage medium of claim 10, wherein identifying the first set of components under repair comprises performing a spectrum-based fault-localization operation.

13. The non-transitory computer-readable storage medium of claim 10, wherein the method further comprises:
determining, while executing the original test, a fourth set of components, wherein execution of the fourth set of components interleaves with execution of the first set of components;
identifying code regions within the fourth set of components that can be simulated using a third block of mock code; and
replacing the identified code regions within the fourth set of components with the third block of mock code.

14. The non-transitory computer-readable storage medium of claim 10, wherein generating a respective block of mock code comprises:
detecting invariants; and
generating the respective block of mock code by setting values of the invariants.

15. The non-transitory computer-readable storage medium of claim 10, wherein generating the second block of mock code further comprises:
generating code that tests the values of the identified one or more variables;
performing a backward slicing analysis to identify code regions within the third set of components that are not related to the identified one or more variables; and
removing the identified code regions.

16. The non-transitory computer-readable storage medium of claim 10, wherein the method further comprises:
in response to determining that multiple identified variables are computed independently, partitioning the fast-result test into multiple smaller tests, wherein each smaller test is configured to test a subset of identified variables, and wherein partitioning the fast-result test comprises performing a backward slicing analysis for each identified variable.

17. A computer system for automatically repairing faults in a software system, the system comprising:
a processor; and
a storage device storing instructions that when executed by the processor cause the processor to perform a method, the method comprising:
identifying a first set of components under repair in the software system;
determining, while executing an original test of the software system, a second set of components which are executed before the first set of components and a third set of components which are executed after the first set of components;
generating a first block of mock code simulating runtime behaviors of the second set of components, wherein the first block of mock code runs faster than the second set of components;
identifying a code region within the third set of components that affects a test result of the software system, which comprises identifying one or more variables whose values provide a prediction of the test result;
generating a second block of mock code that affects the test result in a way similar to the identified code region, wherein the second block of mock code runs faster than the third set of components;
generating a fast-result test corresponding to the original test by replacing the second set of components with the first block of mock code and replacing the third set of components with the second block of mock code; and
performing automatic program repair (APR) on the software system by executing the fast-result test.

18. The computer system of claim 17, wherein performing the APR comprises:
mutating the first set of components under repair for each execution of the fast-result test;
in response to a mutation resulting in a successful execution of the fast-result test, re-running the original test; and
in response to the mutation resulting in a successful execution of the original test, recommending the mutation as a correct repair.

* * * * *